United States Patent [19]

Holzhüter et al.

[11] Patent Number: 5,061,221
[45] Date of Patent: Oct. 29, 1991

[54] DEVICE FOR DIVIDING OR SEPARATING FILLETS

[75] Inventors: Andreas Holzhüter, Lübeck; Michael Jürs, Stockelsdorf, both of Fed. Rep. of Germany

[73] Assignee: Nordischer Maschinenbau Rud. Baader GmbH & Co. KG, Lubeck, Fed. Rep. of Germany

[21] Appl. No.: 551,774

[22] Filed: Jul. 12, 1990

[30] Foreign Application Priority Data

Jul. 22, 1989 [DE] Fed. Rep. of Germany ....... 3924374

[51] Int. Cl.⁵ ................................................ A22C 5/08
[52] U.S. Cl. .................................. 452/184; 452/157; 452/149; 452/161
[58] Field of Search ............... 452/157, 149, 150, 158, 452/156, 161, 162, 170, 182, 184; 209/659, 592

[56] References Cited

U.S. PATENT DOCUMENTS

| | | | |
|---|---|---|---|
| 2,226,019 | 12/1940 | Rooney | 452/149 |
| 2,541,442 | 2/1951 | Skoog | 452/149 |
| 4,476,610 | 10/1984 | Wenzel | 452/170 |
| 4,557,019 | 12/1985 | Van Devanter et al. | 452/157 |
| 4,706,336 | 11/1987 | Hartmann et al. | 452/177 |
| 4,962,568 | 10/1990 | Rudy et al. | 452/157 |

Primary Examiner—Willis Little
Attorney, Agent, or Firm—Fay, Sharpe, Beall, Fagan, Minnich & McKee

[57] ABSTRACT

In an apparatus for dividing fish fillets of the type as shwon e.g. in German Patent 36 23 002 there is used a sorting device, the aim of which is to sort automatically fillet pieces gained under the aspect of predetermined geometric or volumetric properties. To this end, a connecting conveyor is arranged downstream of a belt conveyor of the dividing device leaving a space therewith, in which space is installed a set of flap elements which can be swivelled about a common axis by single activation. In their activated position these function as a transfer chute between the said conveyors, whereas, in their rest position, there remains a discharge shaft downstream of the belt conveyor of the dividing device. The selection of the flap elements to be activated occurs in accordance with a predetermined programme, which makes said selection in accordance with the respective cutting position of the cutting elements of the dividing device and, if necessary, controls these elements with respect to the time parameters.

4 Claims, 1 Drawing Sheet

DEVICE FOR DIVIDING OR SEPARATING FILLETS

BACKGROUND OF THE INVENTION

1. Field of the Invention

The invention relates to an apparatus for processing fish fillets, the apparatus including a device for dividing or separating the fillets into usable pieces of predetermined properties or characteristics, e.g. of geometric or volumetric kind, which device comprises a belt conveyor driven in a rotating manner and conveying the fillets lying flat, as well as a cutting element which is arranged to be controlled with regard to its position relative to the position of the fillet; and, following said dividing device, a sorting device for sorting fillet pieces.

2. Prior Art

According to their equipment and arrangement, such apparatus is able to divide fillets to pieces considering geometric facts, and also to perform a separation, the aim of which is gaining pieces of even weight.

From DE-OS 31 09 174 is known a device for the piecewise delivering or discharging, which device is effective in the sense of a sorting device and includes a conveying path for transporting material in the shape of pieces. This known delivering device has a delivering flap, which can be swivelled in the transport direction in a slanted manner from a transport position in the plane of the conveying path into a delivering position leading away from the conveying path.

With this device, it is, however, only possible to guide whole material pieces from a continuous conveying flow.

From German Patent 36 23 002 there is known a device for an automatic transverse separating of fish fillets, in which device the dividing cuts are performed while automatically adapting to the respective dimensions of the fillet and to other significant optical features. To this end, a cutting device arranged above a conveying plane is used which comprises a set of circular knives having a flattened or cut-off section, which, when facing the conveying plane results in a passage position for the fillets. From this position knives can be brought into a cutting position by a defined turning. The respective position of the circular knives and their activation in correct time by turning is controlled through evaluating/detecting a picture made by a video camera, said evaluation being made by means of a computer.

SUMMARY OF THE INVENTION

It is a primary object of the present invention to receive fillet pieces in a sorted manner.

It is a particular object of the present invention to receive, in the case of fillets in which the belly flaps have been pre-separated by means of a longitudinal cut from the loin piece (back piece), the loin piece and a center piece containing the belly flap separate from each other.

In an apparatus for processing fish fillets, which includes a dividing device for separating the fillets into usable pieces of predetermined characteristics, e.g. with regard to their of geometric or volumetric properties, which device comprises a belt conveyor driven in a rotating manner and conveying the fillets lying flat, as well as a cutting element which is arranged to be controlled with regard to its position relative to the position of the fillet; and, following said dividing device, a sorting device for sorting fillet pieces thus produced, these objects are achieved in that the sorting device comprises a number of flap elements arranged side by side over the width of the belt conveyor, which flap elements are arranged to be controllably moved independently of each other from a basic position being arranged at a distance to the discharge-side deflecting position of the belt conveyor into an activated position continuing the conveying plane of the belt conveyor, the corresponding activation of the flap elements being performed depending on the respective cutting position of the cutting elements of the cutting device and/or of the speed of the belt conveyor.

In order to enable an economically advantageous continuous distribution of the produced fillet pieces, there is provided an arrangement of a continuing conveyor for taking over the fillet pieces sliding over the activating flap elements, as well as of a discharge conveyor below the discharge-side deflecting position of the belt conveyor guiding the fillets through the effective area of the cutting device for the fillet pieces guided away in front of the flap elements.

In order to be able to guide the fillet pieces correctly and accurately in their respective lanes, the flap elements can be provided with web elements supporting the fillet pieces in their activated position, a web edge of said web elements serving as a supporting face for the fillet pieces.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
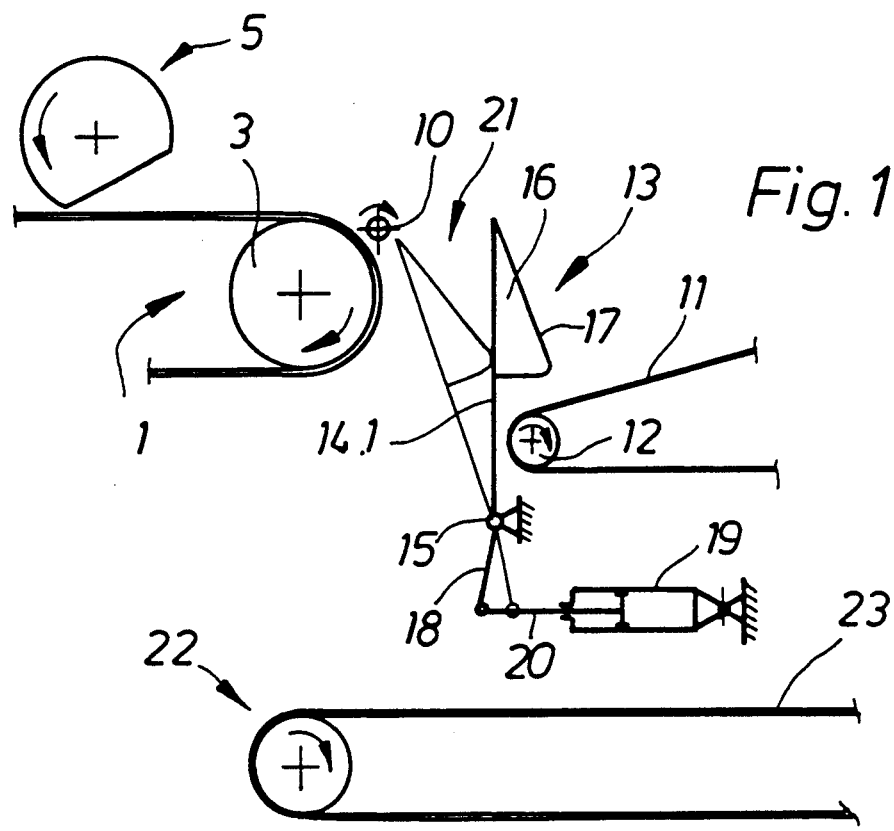
FIG. 1 shows a section of the apparatus according to the invention by way of a side-view.
Figure 2:
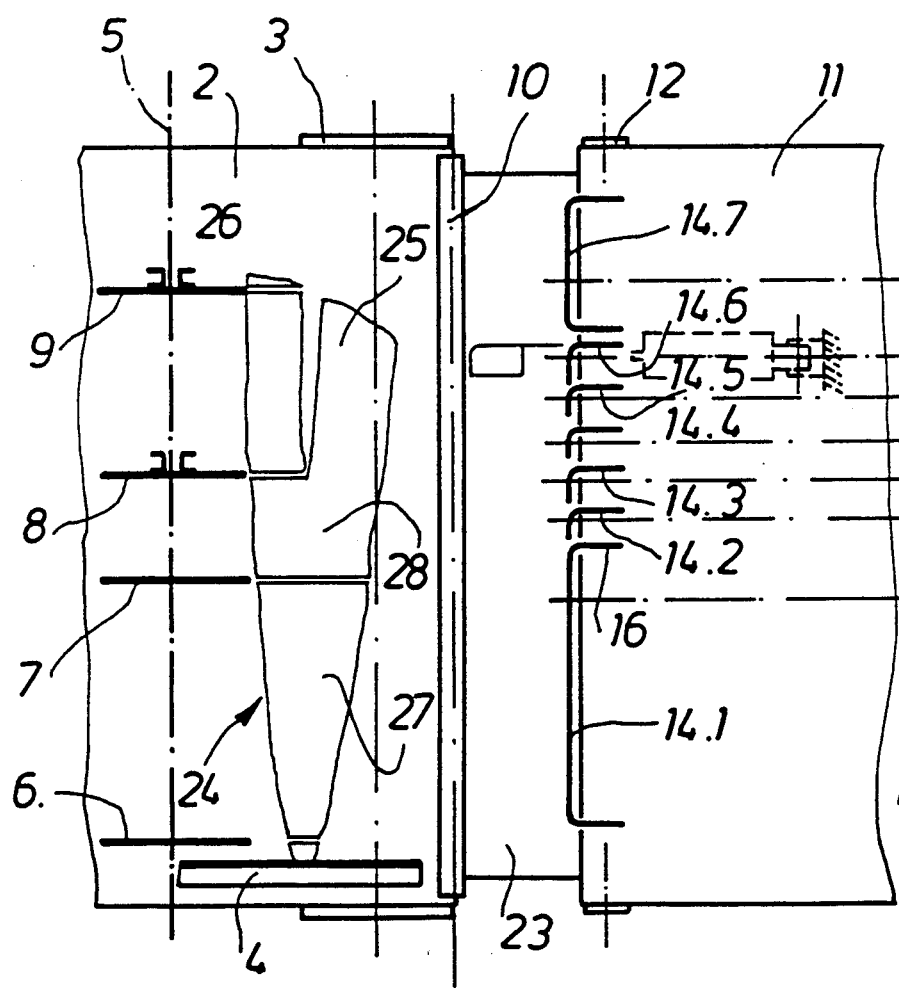
FIG. 2 shows a plan view of FIG. 1.

In an apparatus for dividing fish fillets, for example according to the apparatus as shown in DE-PS 36 23 002 cited in the introductory portion of this specification, there is provided an endless belt conveyor driven to revolve in a suitable manner. In FIGS. 1 and 2 there is shown a rearward deflection area including a deflection roller 3. The conveying surface 2 of the belt conveyor 1 is bounded, close to its side edge, by means of an abutment rail 4. Above the conveying surface 2, there is installed, in accordance with the cited prior art document, a cutting device 5, which has cutting elements 6, 7, 8, 9, at least part of which can be controlled with regard to their cutting position and their activation in correct time depending on the respective size and shape of the fillet. The cutting elements are arranged distributed over the width of the belt conveyor 1. In the area of the deflection roller 3 of the belt conveyor 1 there is provided a driven transfer roller 10, which continues the conveying surface 2 deflected downwardly by the deflection roller 3 and rotating at a higher circumferential speed with regard to the latter.

On a lower level, a separately driven continuing conveyor 11 follows the belt conveyor 1. The arrangement is such that, when seen in the vertical projection according to FIG. 2, there remains a space between the deflection roller 3 of the belt conveyor 1 and the deflection roller 12 of the continuing conveyor 11.

A sorting device 13 is installed in this space. This sorting device comprises a set or series of flap elements 14.1 to 14.7, which are designed as double levers and are mounted to be pivoted about an axis 15 which is fixed to a not shown machine frame and extends below and parallel to the axis of the deflection roller 12. A projecting portion of the flap elements 14.1 to 14.7 is equipped with vertically aligned web elements 16, which have web edges 17, the imaginary extension of which meets, when seen in a downward direction, with the conveying surface of the continuing conveyor 11. The flap elements 14.1 to 14.7 have downwardly directed free rods 18, which are engaged by a piston rod 20 of a pneumatic cylinder 19, so that each flap element may be pivoted separately about the axis 15. The width extensions of the single flap elements differ from each other. Thus, the flap element 14.1, which is associated with the marginal area of the belt conveyor 1 bounded by the abutment rail 4 has the largest width. This flap element 14.1 is followed, corresponding to the embodiment shown in FIG. 2, by five flap elements 14.2 to 14.6 of uniformly narrow design, while the flap element 14.7, which is the last one in the series and is associated with the other marginal area of the belt conveyor 1 has a medium width. Pivoting of the flap elements occurs between a rest position and an active position. In the rest position, the flap elements 14.1 to 14.7 remain in a position in which a discharge or drop shaft 21 remains between the rear side of the flap elements and the deflection roller 3 of the belt conveyor 1. In the active position, which is obtained by charging the piston rod side of the pneumatic cylinder 19, the activated flap element pivots into a position below the transfer roller 10, so that the discharge shaft 21 is bridged and the respective web edge 17 functions as a transfer chute between the belt conveyor 1 and the continuing conveyor 11.

Below the discharge shaft 21 is arranged a discharge conveyor 22 which is driven in an appropriate manner and designed as a conveying belt. This discharge conveyor 22 has a conveying surface 23 forming a conveying discharge face.

The function of the device according to the invention is as follows:

When a picture of the contour of a fish fillet 24 placed on the conveying surface 2 of the belt conveyor 1 with the tail end engaging the abutment rail 4 has been taken by a not shown video camera, information according to a pre-determined programme is given to not shown setting members of the cutting elements 8 and 9 in order to perform a positioning of the cutting elements, which positioning has been detected and ascertained by a computer, also not shown. Simultaneously, the moment for activating the cutting elements to rotate is determined.

The fish fillets 24 may be of different sizes and/or prepared in different manner. For example, the fillet 24 shown in FIG. 2 may be detected as a bone free fillet by the fact that the pin bones extending along the lateral line over the region of the belly cavity have been cut out by a strip cut separating the belly flaps 25 from the loin piece 26. The cutting element 8 is in this case set such that its cutting plane extends across the end of the aforementioned strip cut. The cutting element 9 has the task to straighten the free end of the loin piece 26 and thus to correct any cutting deficiencies which particularly occur in this area following the decapitation. The cutting elements 6 and 7 are set in a fixed manner aiming at producing a tail piece 27 of pre-determined length which is straightened at the tail end.

The time of activating the cutting element 8 for rotation in this particular example occurs such that the belly flap 25 remains in connection with a central piece 28 remaining between the tail piece 27 and the loin piece 26.

The thus prepared fillet pieces are now conveyed towards the sorting device 13, the task of which is to sort out the tail piece 27 and the loin piece 28 as fillet pieces of high quality from the central piece 28 having a lower quality. To this end, the flap element 14.1 is activated before the fish fillet 24 arrives at the transfer roller 10, and the flap elements 14.4, 14.5 and 14.6 are activated just shortly before the loin piece 26 reaches the transfer roller 10. In this manner, the tail piece 27 and the loin piece 26 reach the continuing conveyor 11 by sliding down the web edges 17 of the respective flap elements, the continuing conveyor 11 conveying these fillet pieces out of the device. The effect of the web edges 17 is that lateral forces resulting from a more positive guidance and possibly having an effect on the fillet pieces cannot create any lateral displacements of the fillet pieces. Due to the higher circumferential speed of the transfer roller 10 with respect to the speed of the belt conveyor 1 the belly flap 25 of the central piece 28 of which it is part is accelerated relative to the loin piece 26, so that gravity becomes effective on the belly flap 25 before the loin piece reaches the transfer roller 10. Thereby, a sufficient spacing is obtained between belly flap 25 and loin piece 26, so that the flap elements 14.4, 14.5 and 14.6 can be activated in time to transfer the loin piece 26 onto the continuing conveyor 11. The central piece 28 as well as the end pieces resulting from the severing cuts on the tail piece 27 and the back cut 26 arrive on the discharge conveyor 22 and can thus be transported automatically by the latter e.g. to a separator for producing fish force or mince.

The controlling means or circuitry for coupling the control valves for activating the flap elements 14.1 to 14.7 is such that respective ones of the flap elements are activated by determination depending on the respective position of the cutting elements. This may occur simultaneously if fillets are being treated in which the belly flap has been removed in a preceeding filleting process.

What is claimed is:

1. An apparatus for processing fish fillets, the apparatus including
   a) first conveying means driven in a rotating manner, defining a conveying plane and conveying said fillets lying flat towards a discharge end, which is defined by a discharge end deflection position of said first conveyor means;
   b) dividing means for dividing the fillets into usable pieces of predetermined properties, such as at least one of their geometric and volumetric condition, which dividing means comprise cutting means including cutting elements and cutting-element-controlling means for controlling said cutting elements with regard to their position relative to the position of the respective fillet to be processed; and c) sorting means for sorting said fillet arranged downstream of said dividing means, wherein said sorting means comprise a number of flap elements arranged side by side over the width of said first conveying means and flap controlling means associated with said flap elements, which flap elements are arranged to be controlled by said flap controlling means to move independently of each other from a basic position arranged at a distance from said discharge end of said first conveying means into an activated position continuing said conveying plane of said first conveying means, the corresponding activation of said flap elements being performed depending on at least one of the respective cutting position of said cutting elements and the speed of said conveying means.

2. An apparatus as claimed in claim 1, which apparatus comprises continuing conveying means arranged downstream of said sorting means, which continuing conveying means are arranged such as to take over said fillet pieces sliding over said activated flap elements; as well as discharge conveying means arranged below said discharge end of said first conveying means, which discharge conveying means are arranged to receive fillet pieces guided away before said activation of said flap elements.

3. An apparatus as claimed in claim 1, wherein said flap elements are provided with web elements supporting said fillet pieces in an activated position, a web edge of said web elements serving as a supporting face for said fillet pieces.

4. An apparatus as claimed in claim 2, wherein said flap elements are provided with web elements supporting said fillet pieces in an activated position, a web edge of said web elements serving as a supporting face for said fillet pieces.

* * * * *